United States Patent
Matthews

(10) Patent No.: US 10,212,874 B2
(45) Date of Patent: Feb. 26, 2019

(54) CURVED WAYLINE EXTENSIONS FOR CONTOUR PATH PLANNING

(71) Applicant: AGCO Corporation, Hesston, KS (US)

(72) Inventor: Paul Ross Matthews, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 61 days.

(21) Appl. No.: 15/425,156

(22) Filed: Feb. 6, 2017

(65) Prior Publication Data

US 2017/0223888 A1    Aug. 10, 2017

Related U.S. Application Data

(60) Provisional application No. 62/292,447, filed on Feb. 8, 2016.

(51) Int. Cl.
*A01B 69/04*        (2006.01)
*A01B 79/00*        (2006.01)
*G05D 1/02*         (2006.01)

(52) U.S. Cl.
CPC .......... *A01B 69/008* (2013.01); *A01B 79/005* (2013.01); *G05D 1/0219* (2013.01); *G05D 1/0276* (2013.01); *G05D 2201/0201* (2013.01)

(58) Field of Classification Search
CPC .. A01B 79/005; G05D 1/0219; G05D 1/0276; G05D 2201/0201
See application file for complete search history.

(56) References Cited

U.S. PATENT DOCUMENTS

| | | | |
|---|---|---|---|
| 8,359,141 B1* | 1/2013 | Lange | A01B 69/008 172/2 |
| 2002/0010569 A1* | 1/2002 | Yamamoto | E01C 1/002 703/6 |
| 2005/0187705 A1* | 8/2005 | Niwa | G01C 21/26 701/448 |
| 2006/0178823 A1 | 8/2006 | Eglington et al. | |
| 2007/0084965 A1 | 4/2007 | Lipponen | |
| 2010/0185366 A1 | 7/2010 | Heiniger et al. | |
| 2011/0196565 A1* | 8/2011 | Collins | A01B 69/007 701/26 |

OTHER PUBLICATIONS

European Patent Office, International Search Report for related European Application No. 17154262.4, dated Jul. 4, 2017.

* cited by examiner

*Primary Examiner* — Calvin Cheung

(57) ABSTRACT

In one embodiment, a method for receiving a plurality of data points of a contour wayline having a starting point and an ending point, the contour wayline describing a curved path; generating a description of a curve corresponding to a number of data points; providing curved extensions of the contour wayline based on the description of the curve; and using the curved extensions and the contour wayline for auto-guidance.

13 Claims, 4 Drawing Sheets

CURVED WAYLINE EXTENSIONS FOR CONTOUR PATH PLANNING

CROSS REFERENCE TO RELATED APPLICATION

This application claims the benefit of U.S. Provisional Application No. 62/292,447 filed Feb. 8, 2016, which is hereby incorporated by reference in its entirety.

TECHNICAL FIELD

The present disclosure is generally related to agriculture technology, and, more particularly, computer-assisted farming.

BACKGROUND

Recent efforts have been made to automate or semi-automate farming operations. Such efforts serve not only to reduce operating costs but also improve working conditions for operators and reduce operator error, enabling gains in operational efficiency and yield. For instance, agricultural machines may employ an auto-guidance system to reduce operator fatigue and costs. Auto-guidance systems enable traversal through a field based on waylines, which dictate a path the mobile machine is to take. Waylines are projected left and right based on implement width, enabling the mobile machine to cover the area of the field being worked.

When an operator wishes to use an auto-guidance feature today, the typical procedure is for the operator to navigate a mobile machine over an initial path (whether it is a straight A-B wayline, a contour, etc.) and then the system generates successive waylines based on the width of a coupled implement. Waylines are generated with starting and ending points, though an operator is often faced with extending the waylines given the geometry of the area of the field to be worked or because of other factors such as unfamiliarity with the borders of the field. One approach to handling the need for extensions beyond the wayline is for the operator to terminate the auto-guidance function and manually navigate the mobile machine, though such an approach increases the burden on the operator and may prove to be an annoyance over time. Another approach is adapted for straight A-B waylines, where the waylines are simply extended along a vector established for the original wayline. However, merely extending the wayline along the direction of a previous vector is insufficient for contour waylines, which by definition have curved paths.

BRIEF DESCRIPTION OF THE DRAWINGS

Many aspects of a contour path planning system can be better understood with reference to the following drawings. The components in the drawings are not necessarily to scale, emphasis instead being placed upon clearly illustrating the principles of the contour path planning system. Moreover, in the drawings, like reference numerals designate corresponding parts throughout the several views.

DESCRIPTION OF EXAMPLE EMBODIMENTS

Overview

Figure 1:
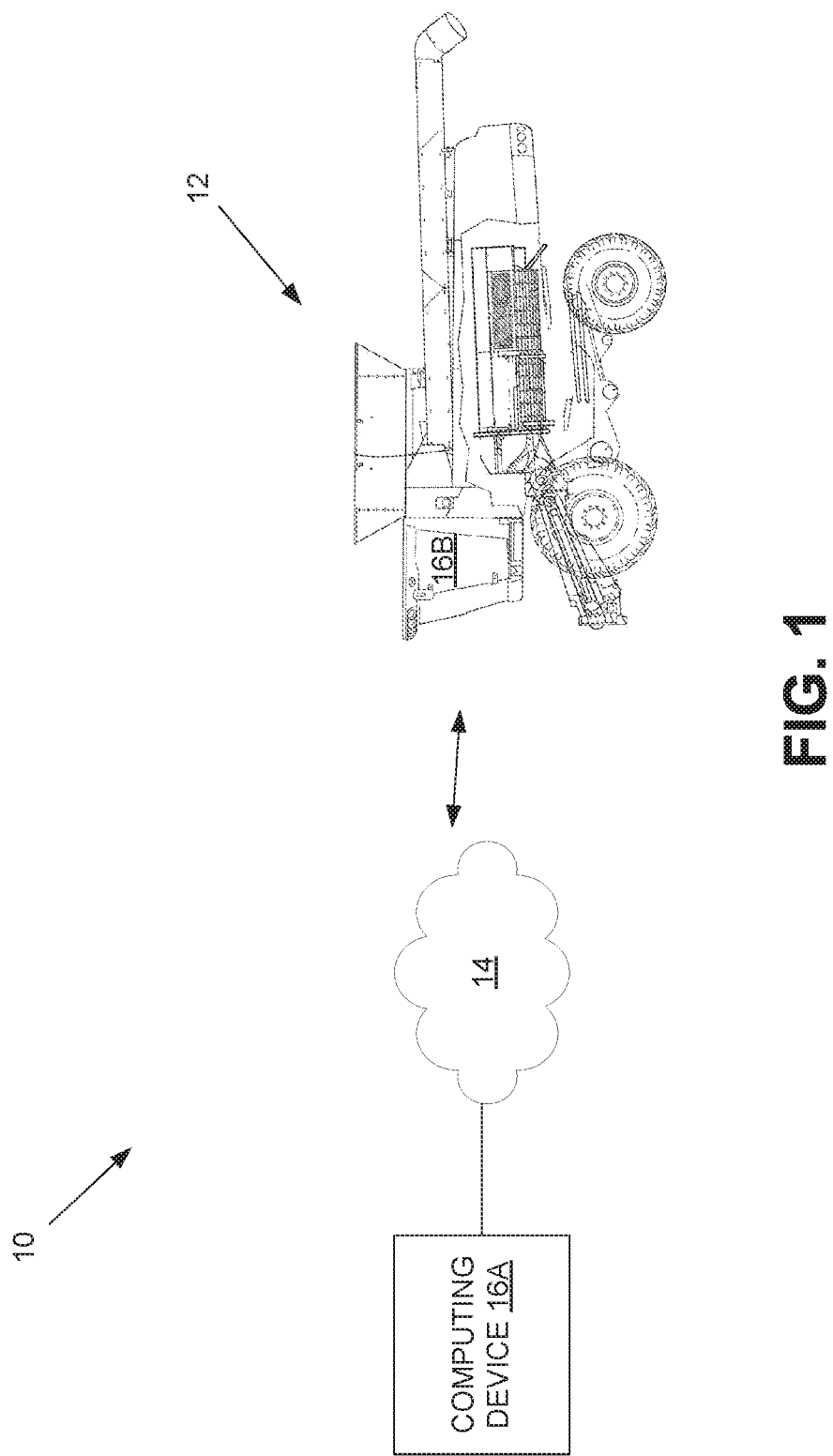
FIG. 1 is a schematic diagram that illustrates an example environment in which an embodiment of a contour path planning system may be implemented.

In one embodiment, a method comprising receiving a plurality of data points of a contour wayline having a starting point and an ending point, the contour wayline describing a curved path; generating a description of a curve corresponding to the plurality of data points; providing curved extensions of the contour wayline based on the description of the curve; and using the curved extensions and the contour wayline for auto-guidance.

Detailed Description

Certain embodiments of a contour path planning system and method are disclosed that generate curved extensions to a contour wayline based on a description of a curve of multiple data points of the contour wayline. Projections to the left and/or right of the contour wayline are determined, and the contour wayline, the projections, and the curved extensions are used for auto-guidance of a mobile machine.

Digressing briefly, and as indicated previously, extensions are either handled by transitioning to manual navigation (e.g., by an operator) or using techniques developed for A-B straight waylines. In particular, typical wayline extension methods typically use the last few (e.g., two (2)) data points of a contour wayline and use these data points to describe a straight line that continues from the original wayline. Using this approach, the contour wayline may be extended with left and/or right projections while keeping a transition from the original and projected waylines to their extensions tangential, yet the projected extensions deviate from parallel with the original extensions (the original meaning the original extension to the contour wayline). Another approach used today projects a line using the last few points, but only on the original wayline. The projected waylines keep their extensions to the same angle, resulting in transitions between the projected waylines and their extensions not being straight. Stated otherwise, the latter approach enables projections to the left and/or right, and keep the projected wayline extensions parallel, yet the transition from the original and projected waylines to their extensions are not tangential. That is, discontinuities, between the projected waylines and their extensions are more evident. In contrast, certain embodiments of a contour path planning system creates a custom-curved wayline extension for the original contour wayline, which is used to generate parallel curved extensions for the subsequent projected waylines. The result is the contour wayline (and corresponding projections) is extended with left and/or right projections, transitions from the original and projected waylines to their extensions remain tangential, and the projected extensions do not deviate from parallel with the original extensions.

Having summarized certain features of a contour path planning system of the present disclosure, reference will now be made in detail to the description of a contour path planning system as illustrated in the drawings. While the contour path planning system will be described in connection with these drawings, there is no intent to limit it to the embodiment or embodiments disclosed herein. For instance, in the description that follows, one focus is on a mobile machine embodied as a combine harvester, though it should be appreciated that some embodiments of contour path planning systems may use other machines, towed or self-propelled, from the same or different industries, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that reference herein to a contour is understood as comprising a curved path, generally described by a series of successive points along a path, that the operator defines for at least a purpose of guiding an automatic steering system. It should be appreciated by one having ordinary skill in the art that variants of contour modes as understood in the industry, such as adaptive curves, and identical curves, and/or controlled traffic, are contemplated to be within the scope of the disclosure. In other words, certain embodiments of a contour path planning system are not intended to be limited to a specific type of contour mode, and are applicable to all such non-linear paths.

Referring now to FIG. 1, shown is a schematic diagram that illustrates an example environment 10 in which an embodiment of a contour path planning system may be implemented. The environment 10 comprises an agricultural environment, and includes one or more mobile machines, such as mobile machine 12, an optional network 14, which may include one or more networks, and one or more computing devices 16 (e.g., 16A, 16B). It should be appreciated within the context of the present disclosure that, though shown using a mobile machine 12 embodied as a combine harvester, some embodiments may utilize other and/or additional agricultural machines (e.g., planters, sprayers, support vehicles, etc.), and hence are contemplated to be within the scope of the disclosure. Further, it is noted that the mobile machine 12 is shown in FIG. 1 without the attached header for purposes of brevity, with the understanding that one of a plurality of different types of headers or other implements may be used with the mobile machine. In one embodiment, contour path planning system may be embodied in the computing device 16A, the computing device 16B, or distributed across devices 16A and 16B. In some embodiments, additional components may comprise an embodiment of the contour path planning system, such as an auto-steer sub-system residing within the mobile machine 12.

The computing device 16A may be a server, computer (e.g., personal computer), or other type of computing device (e.g., electronic control unit or ECU) and/or software that is located at a business (e.g., farm, an Internet Service Provider (ISP) facility, regional or local agricultural machine manufacturer's representative facility, manufacturer's facility, among others), residence, or other locations remote from the mobile machine 12 or field. The computing device 16A may be communicatively coupled to the computing device 16B over the network 14 in a master-slave arrangement, peer-to-peer arrangement, or a combination of both. In some embodiments, the computing device 16A may be associated with a cloud computing platform.

The network 14 may include a wide area network, such as the Internet, and local area networks, such as a radio frequency (RF) network, cellular network, POTS, WiFi, WiMax, satellite, terrestrial, among others. For instance, the computing device 16A may host a web-service, or serve as a gateway to one or more other servers in the Internet, and be coupled to the computing device 16B of the mobile machine 12 over a wireless, cellular connection. For instance, an operator may be in possession of a smartphone with Bluetooth or Near Field Communications (NFC) capability, enabling data exchanges between the computing device 16A over the network 14 with the smartphone, which in turn communicates wirelessly (or via a wired connection, such as Universal Serial Bus, USB) an exchange of data with the computing device 16B. In some embodiments, the computing device 16B may include, or be coupled over a network with (e.g., a propriety network or a controlled area network (CAN) bus, such as implemented according to ISO 11783 (also referred to as "ISOBUS") standard), a radio and/or cellular modem, enabling data exchanges between the computing devices 16A and 16B. In some embodiments, the computing device 16A and/or network 14 may be omitted, and the computing device 16B operates according to data residing locally (e.g., as stored in memory or accessed from a portable storage device).

The mobile machine 12 is depicted as a combine harvester for illustrative purposes. As is known, a combine harvester comprises a chassis coupled to rotating elements (e.g., wheels and/or tracks) and a drive system (e.g., engine, transmission, hydraulic pump, etc.) of known components that comprise coupled actuators to enable control via signals (e.g., over a wired and/or wireless medium) from a computing device 16. The signals enable actuation of steering and/or navigation components associated with the drive system, causing in conjunction with auto-guidance (also known as auto-steer) software, autonomous and/or semi-autonomous traversal of a field in known manner. Since operations of a combine harvester, and drive systems in general, are known to those having ordinary skill in the art, further description of their operations are omitted here for brevity.

An operator of the mobile machine 12 may navigate the mobile machine 12 in a field. Note that reference to an operator may refer to an operator that is residing in the cab of the mobile machine 12 and manipulating on-board navigational controls. In some embodiments, reference to an operator may refer to an operator that is navigating the mobile machine 12 from a remote location. Note that reference to autonomous systems or autonomous control refers to sustained periods of time where there is no direct operator influence on controlled machine navigation.

Figure 2:
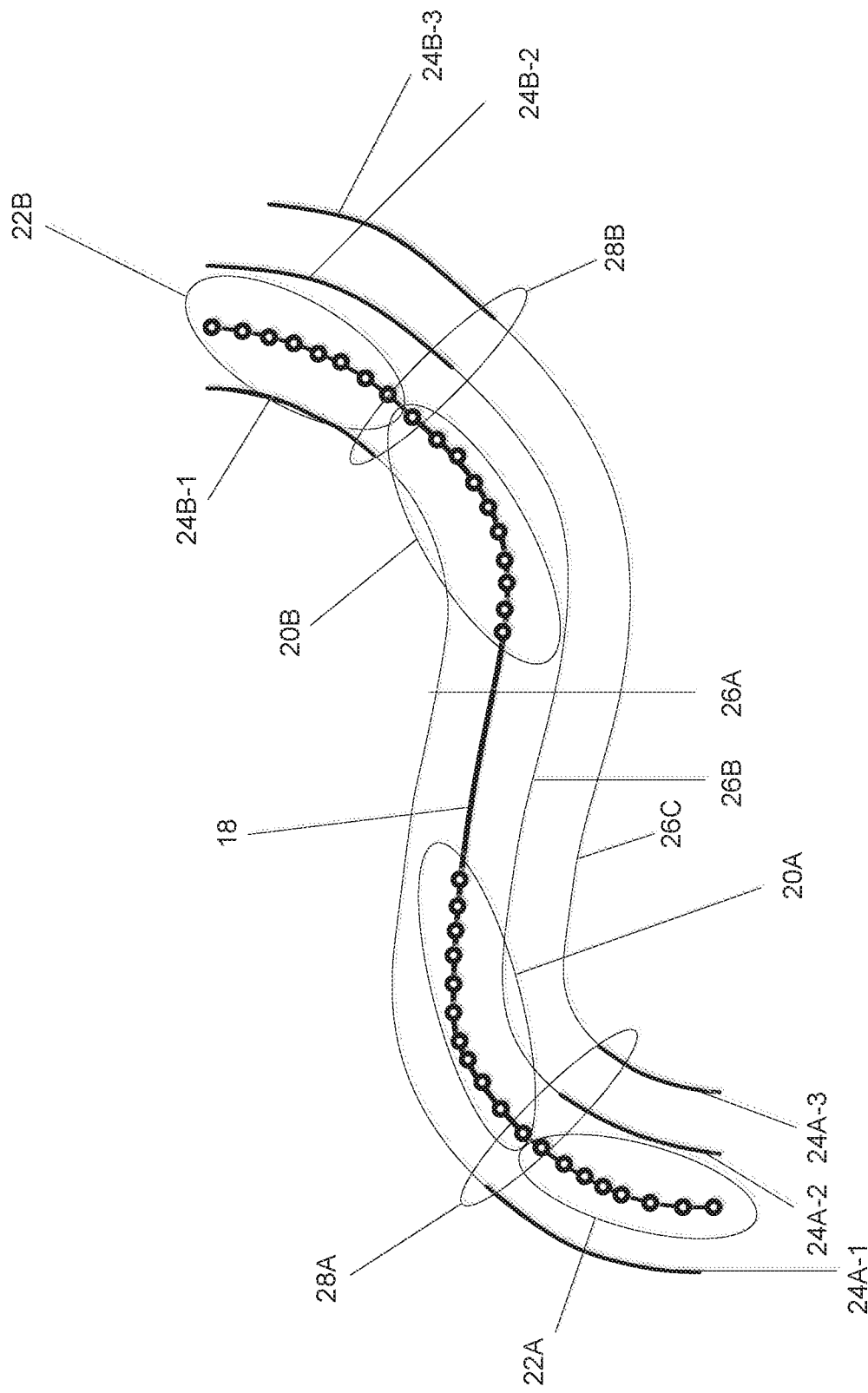
FIG. 2 is a schematic diagram that graphically illustrates a process by which an embodiment of a contour path planning system generates a description of a curve corresponding to a contour wayline.

Referring now to FIG. 2, shown is a schematic diagram that graphically illustrates a process by which an embodiment of a contour path planning system generates a description of a curve corresponding to a contour wayline. For instance, shown is an original contour wayline 18. An operator or other user (collectively referred to hereinafter as an operator) defines the contour, which describes a curved path that the mobile machine 12 (FIG. 1) is to follow in a given field. The operator may use an auto-guidance software tool and visual display device to create the contour based on stored field maps of the field of interest, such as in a pre-planning stage taking place off-site (e.g., in the farmer's home, an office, or other location external to the mobile machine 12 and/or the field) before the mobile machine 12 enters the field. In some embodiments, the operator may generate the contour path in the field (e.g., in real-time or as part of a planning stage) by navigating the mobile machine 12 to a starting point at a particular location in the field and recording that location and traversing a curved path along the field and recording the ending point, whereupon the software generates the contour wayline in known manner.

In one embodiment, software of the contour path planning system collects a plurality of data points 20 (e.g., 20A, 20B) of the original contour wayline 18. Two or more points may be used as input to an algorithm to describe the curve corresponding to the data points. The amount of data points may depend on several factors, such as length and how curvy the curve is (e.g., at or towards the ends). For instance, all points in the last one hundred meters (100 m) of the original contour wayline 18 may be used, or a fixed number (e.g., the last fifty (50) data points) may be used. As another example, the determination of the quantity of data points may depend on the curviness, such as using more data points if the software determines that the end(s) from which an extension is to be added is curvier, such as relative to a threshold curvature or relative to historical (e.g., past usage) determinations.

The software of the contour path planning system analyzes the data points, and based on the analysis, generates a description of a curve corresponding to the plurality of data points. Note that the analysis may involve analyzing the plurality of data points of the original contour wayline 18 spanning from opposing ends of the original contour wayline 18 and progressing towards data points corresponding to a middle of the original contour wayline 18. The software may execute a cubic function algorithm to generate a description of the curve (e.g., the description may be in the form of a cubic function). In other words, the software may use a cubic function to describe the series of points, though in some embodiments, any polynomial or geometric representation and/or statistically derived methods, such as non-linear regression, may be used to generate the description of the curve. Based on the description, the software provides curved extensions 22 (e.g., 22A, 22B) to the original contour wayline 18 and also generates parallel left and right curved projections 24 (e.g., 24A-1*m* 24A-2, 24A-3, 24B-1, 24B-2, and 24B-3) of the curved extensions 22 and contour projections 26 (e.g., 26A, 26B, and 26C) of the original contour wayline 18 (e.g., based on implement width). As noted from FIG. 2, the transitions 28 (e.g., 28A, 28B) from the original and projected contour waylines 18, 26, respectively, to their curved extensions 22 and projected curved extensions 24 are tangential.

Figure 3:
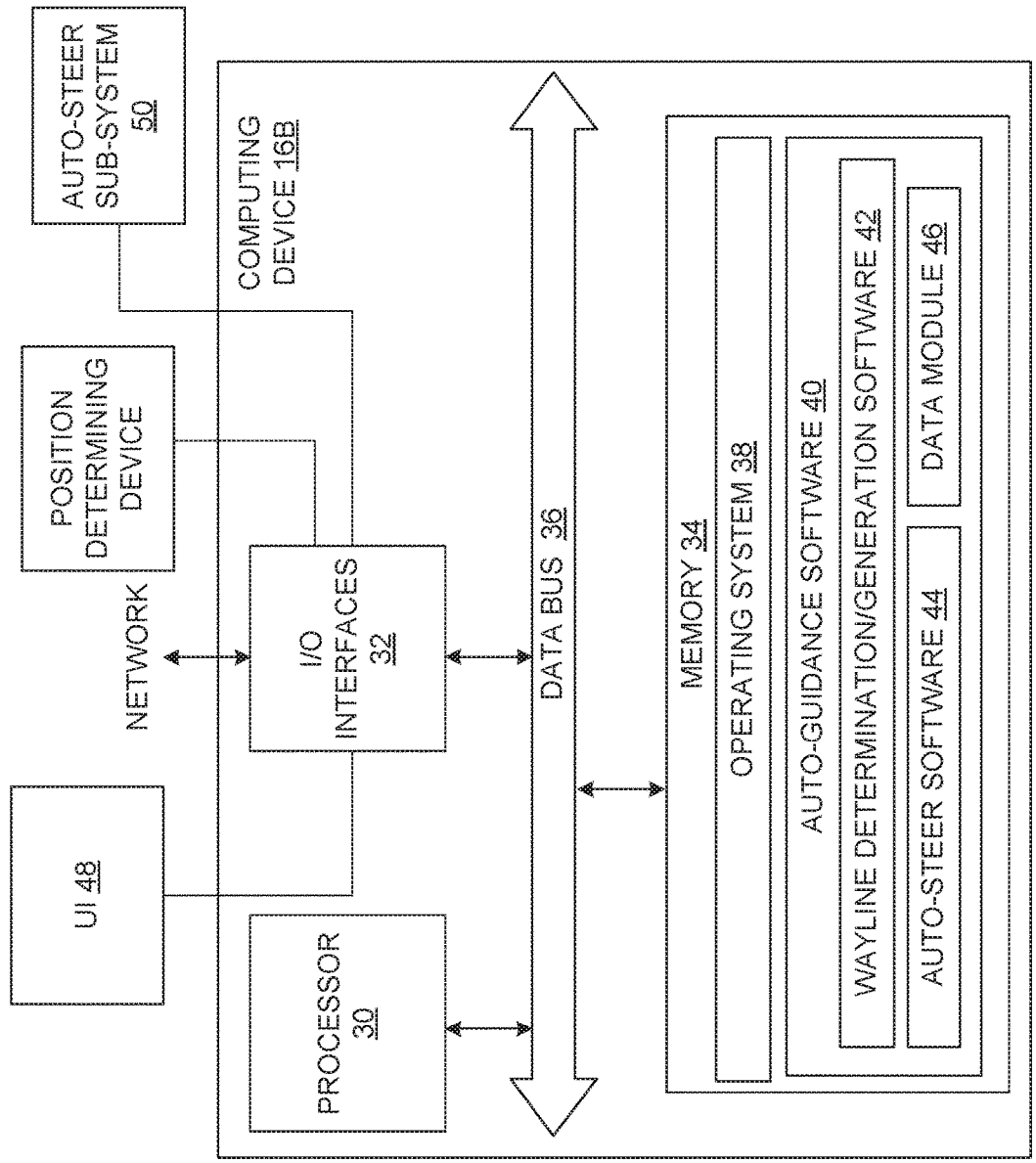
FIG. 3 is a block diagram that illustrates an embodiment of a computing device implemented in an embodiment of a contour path planning system.

Having described certain embodiments of a contour path planning system, attention is directed to FIG. 3, which illustrates an example embodiment of the computing device 16B. One having ordinary skill in the art should appreciate in the context of the present disclosure that the example computing device 16B is merely illustrative, and that some embodiments of computing devices may comprise fewer or additional components, and/or some of the functionality associated with the various components depicted in FIG. 3 may be combined, or further distributed among additional modules and/or devices, in some embodiments. It should be appreciated that, though described in the context of residing in the mobile machine 12 (FIG. 1), in some embodiments, one or more of the functionality of the computing device 16B may be implemented in a computing device or devices located outside of the field, such as in computing device 16A. The computing device 16B is depicted in this example as a computer system (e.g., an electronic control unit or ECU), but may be embodied as a programmable logic controller (PLC), field programmable gate array (FPGA), application-specific integrated circuit (ASIC), among other devices. It should be appreciated that certain well-known components of computer systems are omitted here to avoid obfuscating relevant features of the computing device 16B. In one embodiment, the computing device 16B comprises one or more processors, such as processor 30, input/output (I/O) interface(s) 32, and memory 34, all coupled to one or more data busses, such as data bus 36. The memory 34 may include any one or a combination of volatile memory elements (e.g., random-access memory RAM, such as DRAM, and SRAM, etc.) and nonvolatile memory elements (e.g., ROM, Flash, hard drive, EPROM, EEPROM, CDROM, etc.). The memory 34 may store a native operating system, one or more native applications, emulation systems, or emulated applications for any of a variety of operating systems and/or emulated hardware platforms, emulated operating systems, etc. In the embodiment depicted in FIG. 3, the memory 34 comprises an operating system 38 and auto-guidance software 40. The auto-guidance software 40 comprises wayline determination/generation software 42, auto-steer software 44, and a data module 46 (e.g., data structure, such as a database). It should be appreciated that in some embodiments, additional (e.g., browser, or if located remotely, web-host network software) or fewer software modules (e.g., combined functionality) may be employed in the memory 34 or additional memory. In some embodiments, a separate storage device may be coupled to the data bus 36 (or to a CAN bus or other network via I/O interfaces 32), such as a persistent memory (e.g., optical, magnetic, and/or semiconductor memory and associated drives).

The auto-guidance software 40, and in particular, the wayline determination/generation software 42, comprises executable code for wayline determination and generation, including the generation of a contour wayline and corresponding curved extensions for the contour wayline, as well as projections of the contour wayline and the curved extensions, and auto-steer/auto-guidance functionality according to the generated waylines. In one embodiment (e.g., for preliminary planning), the wayline determination/generation software 42 accesses data (e.g., field maps, with boundaries, topography, machine center of gravity, machine and implement information, etc.) from the data module 46 and receives operator input (e.g., initiation of wayline processing, selection of fields, machine, implement, and/or work information, etc.) and generates an original contour wayline. In some embodiments (e.g., real-time wayline processing), the wayline determination/generation software 42 generates an original contour wayline based on receiving plural inputs corresponding to starting and ending endpoints received based on operator input and position information from a position determining device (e.g., from a global navigation satellite systems (GNSS) receiver located on-board the mobile machine 12 (FIG. 1) as the mobile machine 12 (FIG. 1) traverses the field and generates in known manner the contour wayline. The wayline determination/generation software 42 selects a plurality of data points corresponding to the contour wayline (e.g., based on length, curviness, and/or operator input, etc.), analyzes the plurality of data points, and generates a description (e.g., a cubic function) of a curve corresponding to the plurality of data points. The wayline determination/generation software 42 extends the original contour wayline, creating curved extensions using the description, and projects the waylines (e.g., including the contour waylines and the curved extensions).

The generated waylines, curved extensions, and projections are provided to the auto-steer software 44. The auto-steer software 44 provides for auto-steer functionality of the mobile machine 12 (FIG. 1). For instance, the auto-steer software 44 receives the generated waylines, curved extensions, and projections and enables autonomous or semi-autonomous traversal of the mobile machine 12 as guided by the waylines and machine location data.

As indicated above, one or more of the functionality of the computing device 16B may be implemented remotely from the mobile machine 12 (FIG. 1). For instance, the data stored in data module 46 may reside external to the computing device 16B, such as in separate storage coupled to the CAN network or located remotely (e.g., computing device 16A of FIG. 1 or an associated database). As another example, the original contour wayline may be provided wirelessly from a remote device (e.g., the computing device 16A via one or more networks) or loaded via a portable storage device. In some embodiments, the contour path planning may be implemented entirely remotely and loaded manually or wirelessly communicated to the computing device 16B, or in some embodiments, processing may be shared between the computing devices 16A and 16B.

Execution of the auto-guidance software 40 (and associated software 42-44) may be implemented by the processor 30 under the management and/or control of the operating system 38. The processor 30 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 16B.

The I/O interfaces 32 provide one or more interfaces to the CAN network and/or other networks. In other words, the I/O interfaces 32 may comprise any number of interfaces for the input and output of signals (e.g., comprising analog or digital data) for conveyance of information (e.g., data) over one or more networks. The input may comprise input by an operator (local or remote) through a user interface (UI) 48 (e.g., one or any combination of a keyboard, joystick, steering wheel, headset, mouse, microphone, display screen, touch-type or otherwise, among other types of input devices), and input from signals carrying information from one or more of the components of the mobile machine 12 (FIG. 1), such as machine location information (e.g., GNSS coordinates) from a position determining device, actuators and/or sensors from an auto-steer sub-system 50, among other devices. Outputs may include signals to actuate the actuators of the auto-steer sub-system 50, among other devices. The auto-steer sub-system 50 works in conjunction with the auto-guidance software 40 (e.g., auto-steer software 44) to enable autonomous or semi-autonomous operation of the mobile machine 12.

When certain embodiments of the computing device 16B are implemented at least in part as software (including firmware), as depicted in FIG. 3, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing device 16B are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
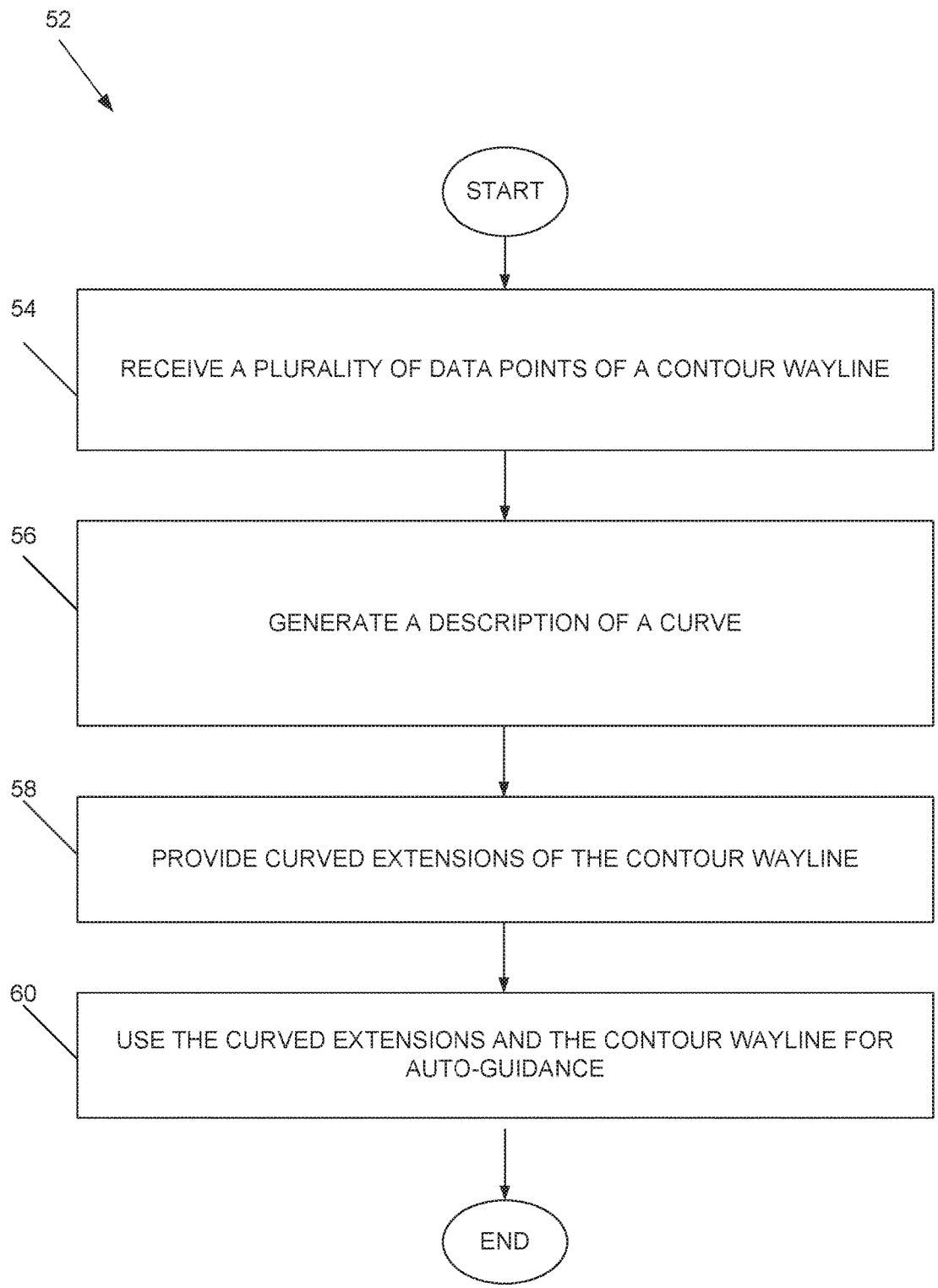
FIG. 4 is a flow diagram that illustrates an embodiment of a contour path planning method.

In view of the above description, it should be appreciated that one embodiment of a contour path planning method 52, depicted in FIG. 4, comprises receiving a plurality of data points of a contour wayline having a starting point and an ending point, the contour wayline describing a curved path (54); generating a description of a curve corresponding to the plurality of data points (56); providing curved extensions of the contour wayline based on the description of the curve (58); and using the curved extensions and the contour wayline for auto-guidance (60).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the contour path planning system and method, particularly, any "preferred" embodiments, are merely possible examples of implementations, merely set forth for a clear understanding of the principles of a contour path planning system. Many variations and modifications may be made to the above-described embodiment(s) of the contour path planning system without departing substantially from the spirit and principles of the disclosure. All such modifications and variations are intended to be included herein within the scope of this disclosure and protected by the following claims.

The invention claimed is:

1. A system, comprising:
    a mobile machine comprising a position determining device and an auto-steer subsystem; and
    a processor configured to execute software to:
        receive input corresponding to a contour wayline having a starting point and an ending point, the contour wayline describing a curved path,
        analyze a plurality of data points of the contour wayline,
        based on the analysis, generate a description of a curve corresponding to the plurality of data points,
        based on the description of the curve, provide curved extensions of the contour wayline for auto-guidance, and
        cause autonomous traversal of the mobile machine along a field according to the contour wayline and the extensions and corresponding projections.

2. The system of claim 1, wherein the processor is configured to cause the autonomous travel based on receiving location information for the mobile device from the position determining device and providing one or more outputs for use by the auto-steer sub-system.

3. The system of claim 1, wherein the processor is co-located with the mobile machine.

4. The system of claim 1, further comprising a modem residing in the mobile machine, wherein the processor is external to the mobile machine and in wireless communication with the modem.

5. The system of claim 1, wherein the processor is configured to analyze, generate, and provide while the mobile machine is in the field.

6. The system of claim 1, wherein the processor is configured to analyze, generate, and provide before the mobile machine is in the field.

7. A method, comprising:
receiving a plurality of data points of a contour wayline having a starting point and an ending point, the contour wayline describing a curved path;
generating a description of a curve corresponding to the plurality of data points, wherein the generating comprises analyzing the plurality of data points of the contour wayline spanning from opposing ends of the contour wayline and progressing towards data points corresponding to a middle of the contour wayline and executing a cubic function algorithm based on the plurality of data points to derive the description;
providing curved extensions of the contour wayline based on the description of the curve; and
using the curved extensions and the contour wayline for auto-guidance.

8. A method, comprising:
receiving a plurality of data points of a contour wayline having a starting point and an ending point, the contour wayline describing a curved path;
generating a description of a curve corresponding to the plurality of data points using a greater quantity of data points for a curvier contour wayline than a contour wayline that is less curvy;
providing curved extensions of the contour wayline based on the description of the curve; and
using the curved extensions and the contour wayline for auto-guidance.

9. A method, comprising:
receiving a plurality of data points of a contour wayline having a starting point and an ending point, the contour wayline describing a curved path;
generating a description of a curve corresponding to the plurality of data points;
providing curved extensions of the contour wayline based on the description of the curve;
using the curved extensions and the contour wayline for auto-guidance; and
generating left, right, or a combination of left and right projections based on the contour wayline and the curved extensions.

10. The method of claim 9, wherein the projections are parallel to each other and the transitions between the contour wayline and projections of the contour wayline are tangential to the respective curved extensions.

11. A method, comprising:
receiving a plurality of data points of a contour wayline having a starting point and an ending point, the contour wayline describing a curved path;
generating a description of a curve corresponding to the plurality of data points;
providing curved extensions of the contour wayline based on the description of the curve; and
using the curved extensions and the contour wayline for auto-guidance;
wherein one or more of the receiving, generating, providing, and using occur at plural locations.

12. A method, comprising:
receiving a plurality of data points of a contour wayline having a starting point and an ending point, the contour wayline describing a curved path;
generating a description of a curve corresponding to the plurality of data points;
providing curved extensions of the contour wayline based on the description of the curve; and
using the curved extensions and the contour wayline for auto-guidance,
wherein one or more of the receiving, generating, providing, and using occur either at a time corresponding to execution of the auto-guidance system or at a time preliminary to executing the auto-guidance system.

13. A non-transitory, computer readable medium comprising executable code to be executed by a processor to cause the processor to:
receive a plurality of data points of a contour wayline having a starting point and an ending point, the contour wayline describing a curved path;
generate a description of a curve corresponding to the plurality of data points using a greater quantity of data points for a curvier contour wayline than a contour wayline that is less curvy;
provide curved extensions of the contour wayline based on the description of the curve; and
use the curved extensions and the contour wayline for auto-guidance.

* * * * *